(12) United States Patent
Chen et al.

(10) Patent No.: US 10,913,056 B2
(45) Date of Patent: Feb. 9, 2021

(54) METHOD FOR SYNTHESIS OF COPPER/COPPER OXIDE NANOCRYSTALS

(71) Applicants: Honda Motor Co., Ltd., Tokyo (JP); Temple University of The Commonwealth System of Higher Education, Philadelphia, PA (US)

(72) Inventors: Gugang Chen, Powell, OH (US); Avetik Harutyunyan, Columbus, OH (US); Yi Rao, North Logan, UT (US); Xia Li, North Logan, UT (US)

(73) Assignees: Honda Motor Co., Ltd., Tokyo (JP); Temple University of The Commonwealth System of Hi, Philadelphia, PA (US)

( * ) Notice: Subject to any disclaimer, the term of this patent is extended or adjusted under 35 U.S.C. 154(b) by 495 days.

(21) Appl. No.: 15/664,795

(22) Filed: Jul. 31, 2017

(65) Prior Publication Data
US 2019/0030523 A1    Jan. 31, 2019

(51) Int. Cl.
*C01G 3/02* (2006.01)
*B01J 31/40* (2006.01)
(Continued)

(52) U.S. Cl.
CPC ......... *B01J 31/4023* (2013.01); *B01J 15/005* (2013.01); *B01J 23/72* (2013.01);
(Continued)

(58) Field of Classification Search
CPC ........ B01J 31/4023; B01J 23/72; B01J 23/94; B01J 15/005; C01G 3/00; C01G 3/02
See application file for complete search history.

(56) References Cited

U.S. PATENT DOCUMENTS

| 5,252,355 A | 10/1993 | Ando et al. |
| 6,921,712 B2 | 7/2005 | Soininen et al. |

(Continued)

FOREIGN PATENT DOCUMENTS

| CN | 102502772 | 12/2013 |
| CN | 106378141 | 2/2017 |

OTHER PUBLICATIONS

Yang, Ai-ling, et al. "Fabrication of Cu2O@ Cu2O core-shell nanoparticles and conversion to Cu2O@ Cu core-shell nanoparticles in solution." Transactions of Nonferrous Metals Society of China 25.11 (2015): 3643-3650.*

(Continued)

*Primary Examiner* — Richard M Rump
(74) *Attorney, Agent, or Firm* — Rankin, Hill & Clark LLP (57) ABSTRACT

A simple approach to produce mixed $Cu/Cu_2O$ nanocrystals having a specific morphology by controlling the reaction temperature during $Cu/Cu_2O$ nanocrystals synthesis. Other variables are kept constant, such as the amount of reactants, while the reaction temperatures is maintained at a predetermined temperature of 70° C., 30° C. or 0° C., which are used to produce different and controlled morphologies for the $Cu/Cu_2O$ nanocrystals. The reaction mixture includes a copper ion contributor, a capping agent, a pH adjustor, and reducing agent. The reaction mixture is held at the predetermined temperature for three hours to produce the $Cu/Cu_2O$ nanocrystals. The synthesis method has advantages such as mass production, easy operation, and high reproducibility.

23 Claims, 12 Drawing Sheets

(51) Int. Cl.
  B01J 15/00 (2006.01)
  B01J 23/72 (2006.01)
  B01J 23/94 (2006.01)
(52) U.S. Cl.
  CPC ............... *B01J 23/94* (2013.01); *C01G 3/02* (2013.01); *C01P 2002/72* (2013.01); *C01P 2002/85* (2013.01); *C01P 2004/03* (2013.01); *C01P 2004/38* (2013.01); *C01P 2004/62* (2013.01); *C01P 2004/80* (2013.01)

(56) References Cited

U.S. PATENT DOCUMENTS

| | | |
|---|---|---|
| 8,900,659 B2 | 12/2014 | Zeng et al. |
| 2004/0221685 A1 | 11/2004 | Jeong et al. |
| 2006/0235087 A1 | 10/2006 | Alexandridis et al. |
| 2014/0060639 A1 | 3/2014 | Zeira et al. |
| 2015/0259305 A1 | 9/2015 | Huang et al. |
| 2018/0119296 A1 | 5/2018 | Geioushy et al. |

OTHER PUBLICATIONS

Aslam, Mohammed, et al. "Formation of Cu and Cu2O nanoparticles by variation of the surface ligand: preparation, structure, and insulating-to-metallic transition." Journal of colloid and interface science 255.1 (2002): 79-90.*
Luo, Xiaolin, et al. "Sonochennical synthesis of porous Cu2O—Cu hollow spheres and their photo-catalysis." Materials Chemistry and Physics 151 (2015): 252-258.*
Ping, Tao, et al. "Enhanced photocatalytic activity of Cu2O/Cu heterogeneous nanoparticles synthesized in aqueous colloidal solutions on degradation of methyl orange." Rare Metal Materials and Engineering 45.9 (2016): 2214-2218.*
English machine translation of CN102502772 (2011).*
English machine translation of CN103042231 (2013).*
English machine translation of CN105879887 (2016).*
Extended European Search Report of European Serial No. 18186469.5 dated Dec. 3, 2018, 8 pages.
Dong-Feng Zhang et al., "Delicate control of crystallographic facet-oriented Cu2O nanocrystals and the correlated adsorption ability", Journal of Materials Chemistry, vol. 19, No. 29, Jan. 1, 2009, pp. 5220-5225.
Qing Hua et al., "Morphological Evolution of Cu2O Nanocrystals in an Acid Solution: Stability of Different Crystal Planes", Langmuir, vol. 27, No. 2, Jan. 18, 2011, pp. 665-671.
Andal. V. and Buvaneswari, G. "Effect of reducing agents in the conversion of Cu2O nanocolloid to Cu nanocolloid." Engineering Science and Technology, an International Journal. vol. 20, Issue 1, Feb. 2017, pp. 340-344.
De Brito, J.F., da Silva, A.A., Cavalheiro, A.J., Zanoni, M.V.B. Evaluation of the Parameters Affecting the Photoelectrocatalytic Reduction of CO2 to CH3OH at Cu/Cu2O Electrode. Int. J. Electrochem. Sci. 2014, 9, 5961-5973.
Eilert, A.; Cavalca, F.; Roberts, F. S.; Osterwalder, J. r.; Liu, C.; Favaro, M.; Crumlin, E. J.; Ogasawara, H.; Friebel, D.; Pettersson, L. G. "Subsurface oxygen in oxide-derived copper electrocatalysts for carbon dioxide reduction." The journal of physical chemistry letters 2016, 8 (1), 285-290.
Handoko, A.D., and Tang, J. "Controllable proton and CO2 photoreduction over Cu2O with various morphologies" International Journal of Hydrogen Energy. vol. 38, Issue 29, 30 Sep. 2013, pp. 13017-13022.
Hori, Y.; Koga, O.; Yamazaki, H.; Matsuo, T. "Infrared spectroscopy of adsorbed CO and intermediate species in electrochemical reduction of CO2 to hydrocarbons on a Cu electrode." Electrochimica acta 1995, 40 (16), 2617-2622.
Janáky, C., Hursán, D., Endrodi, B., Chanmanee, W., Roy, D., Liu, D., de Tacconi, N., Dennis, B.H., Rajeshwar, K. "Electro-and photoreduction of carbon dioxide: The twain shall meet at copper oxide/copper interfaces." ACS Energy Letters. 2016, 1 (2), 332-338.

Jewell, E., Hernandez, E., and Macdonald, J.E. "Photdegradation study of Copper (I) Oxide nanoparticles synthesized with different geometries." https://www.vanderbilt.edu/vinse/docs/NSF-REU-Erik-Jewell- Poster.pdf.
Kas, R., Kortlever, R., Milbrat, A., Koper, M.T., Mul, G., Baltrusaitis, J. "Electrochemical CO 2 reduction on Cu2O-derived copper nanoparticles: Controlling the catalytic selectivity of hydrocarbons." Physical Chemistry Chemical Physics. 2014, 16(24), 12194-12201.
Kauffman, D. R., Ohodnicki, P.R., Kail, B.W., Matranga, C. "Selective electrocatalytic activity of ligand stabilized copper oxide nanoparticles." The Journal of Physical Chemistry Letters. 2011, 2(16), 2038-2043.
Kim, D.; Kley, C. S.; Li, Y.; Yang, P. "Copper nanoparticle ensembles for selective electroreduction of CO2 to C2-C3 products." Proceedings of the National Academy of Sciences 2017, 114 (40), 10560-10565.
Kuhl, K. P.; Cave, E. R.; Abram, D. N.; Jaramillo, T. F. "New insights into the electrochemical reduction of carbon dioxide on metallic copper surfaces" Energy & Environmental Science 2012, 5 (5), 7050-7059.
LaGrow, A., Ward, M., Lloyd, D., Gai, P., and Boyes, E.D. "Visualizing the Cu/Cu2O Interface Transition in Nanoparticles with Environmental Scanning Transmission Electron Microscopy." Journal of the American Chemical Society. 2017, 139, pp. 179-185.
Le, M. Ren, M. Zhang, Z., Sprunger, P.T., Kurtz, R. L, Flake, J.C. "Electrochemical reduction of CO2 to CH3OH at copper oxide surfaces." Journal of the Electrochemical Society. 2011, 158 5), E45-E49.
Li, C.W., Kanan, M.W. "CO2 reduction at low overpotential on Cu electrodes resulting from the reduction of thick Cu2O films." Journal of the American Chemical Society. 2012, 134 (17), 7231-7234.
Liang, Y., Shang, L., Bian, T., Zhou, C., Zhang, D., Yu, H., Xu, H., Shi, Z., Zhang, T., Wu, L., and Tung, C. "Shape-controlled synthesis of polyhedral 50-facet Cu2O microcrystals with high-index facets." CrystEngComm. 14(13): 1431-4436, Jun. 2012.
Lum, Y. Yue, B. Lobaccaro, P., Bell, A.T., Ager, J.W. "Optimizing C—C coupling on oxide-derived copper catalysts for electrochemical CO2 reduction." The Journal of Physical Chemistry C. 2017, 121 (26), 14191-14203.
Ma, M., Djanashvili, K., Smith, W.A. "Selective electrochemical reduction of CO 2 to CO on CuO-derived Cu nanowires." Physical Chemistry Chemical Physics. 2015, 17 (32), 20861-20867.
Magdassi, S., Grouchko, M. and Kamyshny, A. "Copper Nanoparticles for Printed Electronics: Routes Towards Achieving Oxidation Stability." Materials. 2010, 3(9), 4626-4638.
T. Pal and J. Pal. "Faceted Metal and Metal Oxide Nanoparticles: Design, Fabrication and Catalysis". Nanoscale. 7(34) Jul. 2015.
Pérez-Gallent, E.; Marcandalli, G.; Figueiredo, M. C.; Calle-Vallejo, F.; Koper, M. T. "Structure-and Potential-Dependent Cation Effects on CO Reduction at Copper Single-Crystal Electrodes." Journal of the American Chemical Society 2017, 139 (45), 16412-16419.
Roberts, R.S., Kuhl, K.P., Nilsson, A. "Electroreduction of carbon monoxide over a copper nanocube catalyst: surface structure and pH dependence on selectivity." ChemCatChem. 2016, 8 (6), 1119-1124.
Wang, L., Gupta, K., Goodall, J.B., Darr, J.A., Holt, K. B. "In situ spectroscopic monitoring of CO2 reduction at copper oxide electrode." Faraday discussions. 2017, 197, 517-532.
Wang, G., Sun, H., Ding, L., Zhou, G. and Wang, Z. "Growth of Cu particles on a Cu2O truncated octahedron: tuning of the Cu content for efficient glucose sensing." Physical Chemistry Chemical Physics. Issue 37, 2015.
Wang, X., Varela, A.S., Bergmann, A., Kuehl, S., Strasser, P. "Catalyst particle density controls hydrocarbon product selectivity in CO2 electroreduction on CuOx." ChemSusChem. 2017.
Zhang Y., Deng, B., Zhang, T., Gao, D. and Xu, A. "Shape Effects of Cu2O Polyhedral Microcrystals on Photocatalytic Activity." J. Phys. Chem. C. 2010, 114, 11, 5073-5079.
Zhang, Qiu-li, Yang, Zhi-Mao, Ding, Bing-jun, Lan, Xin-zhe, and Guo, Ying-juan., "Preparation of copper nanoparticles by chemical (56) References Cited

OTHER PUBLICATIONS reduction method using potassium borohydride", Trans. Nonferrous Met. Soc. China 20(2010) s240-s244.

Huan, T.N., Simon, P., Benayad, A., Guetaz, L., Artero, V., and Fontecave, M. "Cu/Cu2O Electrodes and CO2 Reduction to Formic Acid: Effects of Organic Additives on Surface Morphology and Activity." Chemistry—A European Journal. 2016, 22 (39), 14029-14035.

Nie, X., Griffin, G.L., Janik, M.J., Asthagiri, A. "Surface phases of Cu2O (111) under CO2 electrochemical reduction conditions." Catalysis Communications. 2014, 52, 88-91.

Qiao, J., Liu, Y., Hong, F., Zhang, J. "A review of catalysts for the electroreduction of carbon dioxide to produce low-carbon fuels." Chemical Society Reviews. 2014, 43 (2), 631-675.

Ren, D., Deng, Y., Handoko, A.D., Chen, C.S., Malkhandi, S., Yeo, B.S. "Selective electrochemical reduction of carbon dioxide to ethylene and ethanol on copper (I) oxide catalysts." ACS Catalysis. 2015, 5 (5), 2814-2821.

Bao et al., Shape-Dependent Reducibility of Cuprous Oxide Nanocrystals, J. Phys. Chem. C 2010, 114, 6676-6680.

Bugayong, Joel Niño Galvez, "Electrochemical Reduction of CO2 on Supported Cu2O Catalysts" (2014). LSU *Doctoral Dissertations*. 2858, http://digitalcommons.lsu.edu/gradschool_dissertations/2858.

Gawande et al., Cu and Cu-Based Nanoparticles: Synthesis and Applications in Catalysis, Chem. Rev. 2016, 116, 3722-3811.

Gou et al., Solution-Phase Synthesis of Cu2O Nanocubes, 2003 American Chemical Society, Nano Letters, 2003, 3(2), pp. 231-234.

Hua et al., Crystal Plane-Dependent Compositional and Structural Evolution of Uniform Cu2O Nanocrystals in Aqueous Ammonia Solutions, J. Phys. Chem. C 2011, 115, 20618-20627.

Kuo et al., Fabrication of Truncated Rhombic Dodecahedral Cu2O Nanocages and Nanoframes by Particle Aggregation and Acidic Etching, J. Am. Chem. Soc. 2008, 130, 12815-12820 (hereinafter "Kuo et al. II").

Kuo et al., Seed-Mediated Synthesis of Monodispersed Cu2O Nanocubes with Five Different Size Ranges from 40 to 420 nm, Adv. Funct. Mater. 2007, 17, 3773-3780 (hereinafter "Kuo et al. I").

\* cited by examiner

METHOD FOR SYNTHESIS OF COPPER/COPPER OXIDE NANOCRYSTALS

BACKGROUND

Electrochemical conversion of carbon dioxide ($CO_2$) to liquid fuels is an important research area aimed at developing technologies that promote carbon neutral energy cycles. Copper metal (Cu) is a well-known electrocatalyst for the reduction of $CO_2$ to products of methane ($CH_4$), ethylene ($C_2H_4$), and alcohols such as methanol ($CH_3OH$). Cu is desirable because it is more abundant and less expensive compared to other noble metals such as gold and silver that may be used for such purposes. In addition, Cu has the second highest electrical conductivity among all metals. However, the surface of Cu can be easily oxidized during synthesis and storage, therefore reducing its electrocatalytic activity.

An alternative to Cu is cuprous oxide ($Cu_2O$). $Cu_2O$ crystals are reducible, and the crystals include a higher number of low-coordinated active sites than Cu. $Cu_2O$ is one of the three stable oxide forms of Cu, which can have an oxidation state of +1 or +2. The unit cell of $Cu_2O$ crystals consists of four copper atoms and two oxygen atoms. $Cu_2O$ has a lattice constant of 4.2696 Å. In $Cu_2O$, copper atoms are arranged in a face-centered manner while oxygen atoms are arranged in a body-centered manner. Copper atoms are linearly coordinated to two oxygen atoms, while oxygen atoms are tetrahedrally coordinated to four copper atoms. The synthesis of $Cu_2O$ has been widely investigated. These studies mainly focused on using various methods of synthesis to control the size of the $Cu_2O$ particles.

$Cu_2O$ acts as an electrocatalyst for $CO_2$ conversion. It was found that methanol is a major product from the reduction of $CO_2$. Cu (I) sites in the electrocatalyst are believed to drive high $CH_3OH$ generation from $CO_2$. In the reduction of $CO_2$ using $Cu_2O$ as a catalyst, the {110} facet series have shown superior catalytic performance as compared to other crystal facets due to the surface energies of the $Cu_2O$ crystallographic facets. The crystallographic facets are generally arranged in the order from least to most catalytic performance of r {100}<r {111}<r{110}<r {hkl}.

In this regard, the surfaces of $Cu_2O$ minimize their free energy by reconstruction, and include facet growth on certain clean or adsorbate-covered atomically rough surfaces during the reduction. Surface energy of $Cu_2O$ is minimized by the formation of hill-and-valley nanostructures with high-energy index facets in close-packed orientations for a higher selectivity of $CO_2$ reduction.

BRIEF DESCRIPTION

According to one aspect, a method of producing $Cu_2O$/Cu nanocrystals includes providing 70-90 ml of a solvent. A reaction mixture is prepared by dissolving copper (II) chloride dihydrate in the solvent to provide a molar concentration of 9-11 mM copper (II) chloride dihydrate in the solvent, dissolving polyvinylpyrrolidone with an average molecular weight of 35,000-45,000 g/mol in the solvent to provide a molar concentration of 0.02-0.06 mM polyvinylpyrrolidone in the solvent, adding 9-11 mL of 0.1-0.3 M sodium hydroxide aqueous solution to the solvent, and adding 9-11 mL of 0.4-0.8 M L-ascorbic acid to the solvent. The method includes stirring the reaction mixture at a predetermined temperature for two to four hours to thereby precipitate $Cu_2O$/Cu nanocrystals. The predetermined temperature is from 65° C. to 75° C., from 25° C. to 35° C., or from −5° C. to 5° C.

DETAILED DESCRIPTION

The present subject matter provides a method for morphology controlled synthesis of nanocrystals comprising a mixture of Cu and $Cu_2O$ (herein referred to as "Cu/$Cu_2O$ nanocrystals" or "mixed Cu/$Cu_2O$ nanocrystals"). The method produces mixed Cu/$Cu_2O$ nanocrystals that incorporate the advantages of both Cu and $Cu_2O$ nanostructures, which can be used in the reduction of $CO_2$, for example, in the reduction of $CO_2$ to methanol.

The Cu/$Cu_2O$ nanocrystals are produced by a reduction reaction performed at a predetermined reaction temperature. When other variables are kept constant, the predetermined reaction temperature can be varied to control the morphology of the product of Cu/$Cu_2O$ nanocrystals. The morphology characteristics controlled by the reaction temperature can include the average size of crystals in the product, the copper to oxygen ratio in the product, the shape of the crystals in the product, or combinations thereof.

By performing the reduction reaction at certain predetermined temperatures, the morphology of the Cu/$Cu_2O$ nanocrystals can be controlled with repeated consistency to obtain a desired crystal morphology. That is, performing the reaction at certain predetermined temperatures will provide Cu/$Cu_2O$ nanocrystals having a particular average particle size, a particular ratio of copper to oxygen, a particular shape including a higher ratio of {110} facets and {220} facets, or combinations thereof. Cu/$Cu_2O$ nanocrystals having certain morphologies can influence their electrocatalytic activity when they are used for the reduction of $CO_2$.

The reduction reaction may be performed at the predetermined temperature using a wet chemical process including a reaction mixture of raw materials. The raw materials used in synthesizing Cu/$Cu_2O$ nanocrystals may therefore include a solvent, which may be used to dissolve other raw materials so that a wet chemical reaction can proceed between the reactants. The solvent may include any liquid capable of solubilizing the other raw materials, and can include tap or deionized water, aqueous ammonia solutions, or an organic solvent such as methanol, ethanol, acetone, ether, or glycerol for example. In one non-limiting embodiment, the solvent includes deionized water.

The raw materials used in the reduction reaction for synthesizing Cu/Cu$_2$O nanocrystals can include a copper ion contributor, which may be any substance that is capable of contributing copper ions ($Cu^{2+}$), including for example, a copper salt or hydrate thereof. The copper salt can include for example copper (II) chloride ($CuCl_2$), copper (II) fluoride ($CuF_2$), copper (II) chloride ($CuCl_2$), copper (II) bromide ($CuBr_2$), copper (II) iodide ($CuI_2$), cuprous iodide (CuI), copper (II) oxide (CuO), copper (II) sulfide (CuS), copper (II) sulfate ($CuSO_4$), copper (II) nitride ($Cu_3N_2$), copper(II) nitrate ($Cu(NO_3)_2$), copper (II) phosphide ($Cu_3P_2$), copper(II) acetate ($Cu(CH_2CO_2^-)$), copper (II) hydroxide ($CuOH)_2$, copper(II) carbonate ($CuCO_3$), and copper(II) acetylacetonate ($Cu(C_5H_7O_2)_2$). In one non-limiting example, the copper ion contributor includes copper (II) chloride dihydrate ($CuCl_2.2H_2O$).

The copper ion contributor can be added to the solvent as a solid that is then dissolved therein. The amount of the copper ion contributor used in the reaction in not critical, and the copper ion contributor can be included at an amount to provide a molar concentration (i.e. molarity) of 1-20 millimoles (mmol) of copper ion contributor per liter (L) of solvent, i.e. mmol/L or millimolar (mM). The copper ion contributor may also be included to provide a molar concentration of 5-15 mM, or 9-11 mM, or about 10 mM. In one non-limiting example, the copper ion contributor is copper (II) chloride dihydrate, and is included in an amount to provide a molar concentration of 10 mM of copper (II) chloride dihydrate in the solvent, or 0.8 mmol of copper (II) chloride dihydrate per 80 mL of solvent.

The materials used in synthesizing Cu/Cu$_2$O nanocrystals may also include a capping agent, which is used to stabilize the nanocrystals and control the nanocrystal growth. The capping agent may include for example, polyvinylpyrrolidone (PVP), plant-derived extracts such as those from Terminalia arjuna, ethylene glycol, oleic acid, sodium laureth sulfate, sodium metaphosphate, oleylamine, dodecylbenzenesulfonic acid, ethylene diamine, triphenylphosphine oxide, peracetic acid, polyethylene glycol, fructose, tetramethylammonium hydroxide, and amino acids such as L-arginine. In one non-limiting example, the capping agent includes solid PVP with an average molecular weight of 30,000-50,000 g/mol, or 35,000-45,000 g/mol, or 40,000 g/mol.

The capping agent may be added to the solvent as a solid for dissolution therein. The amount of capping agent used in the reaction in not critical, and the capping agent can be included at an amount to provide a molar concentration of 0.01-0.08 mM, 0.02-0.06 mM, or 0.03-0.05 mM, or about 0.04 mM. In one non-limiting example, the capping agent is PVP with an average molecular weight of 40,000 g/mol, and is included in an amount to provide a molar concentration of 0.04 mM of PVP in the solvent, or 3.2 micromoles (μm) of PVP per 80 mL of solvent.

The materials used in synthesizing Cu/Cu$_2$O nanocrystals may also include a pH adjustor, which can include various acids or bases such as sodium hydroxide (NaOH) or ammonia for example. The pH adjustor may be used to adjust the pH of the reaction mixture to be between 2.0 and 12.0. The pH adjustor may be introduced as a solid for dissolution in the solvent, or as a solution, such as an aqueous solution after the pH adjustor has been dissolved in water. In one non-limiting example, the pH adjustor includes sodium hydroxide, which may be introduced as an aqueous solution having a molar concentration of sodium hydroxide of 0.05-0.4 M, 0.1-0.3 M, or about 0.2 M, and in an amount of 1-20 mL, 5-15 mL, 9-11 mL, or about 10 mL of the solution. In one aspect, 10 mL of 0.2 M sodium hydroxide aqueous solution is introduced into the reaction mixture.

The materials used in synthesizing Cu/Cu$_2$O nanocrystals may also include a reducing agent, which is included to donate electrons (by oxidation of the reducing agent) that are used for the reduction of the copper ions to produce Cu/Cu$_2$O nanocrystals. The reducing agent may include for example, L-ascorbic acid (i.e. vitamin C, or $C_6H_8O_6$), hydrazine monohydrate, sodium borohydride, hydrazine, 1,2-hexadecanediol, glucose, carbon monoxide, sulfur dioxide, iodides, hydrogen peroxide, oxalic acid, formic acid, carbon, reducing sugars, or a borane compound.

The reducing agent may be added to the solvent as a solid for dissolution therein, or in a solution, such as an aqueous solution after the reducing agent has been dissolved in water. In one non-limiting example, the reducing agent is added to the solvent as a solution. The amount of the reducing agent used in the reaction is not critical. In one non-limiting example, the reducing agent includes L-ascorbic acid, which may be introduced as an aqueous solution having a molar concentration of L-ascorbic acid of 0.1-1 M, 0.4-0.8 M, or about 0.6 M, and in an amount of 1-20 mL, 5-15 mL, 9-11 mL, or about 10 mL of the solution. In one aspect, 10 mL of 0.6 M L-ascorbic acid aqueous solution is introduced into the reaction mixture.

A method of synthesizing Cu/Cu$_2$O nanocrystals includes providing a solvent and dissolving a copper ion contributor in the solvent. A capping agent is then dissolved in the solvent, followed by the addition of a pH adjuster (in the form of an aqueous solution) and reducing agent (in the form of an aqueous solution) to thereby form a reaction mixture. The method includes stirring the reaction mixture for two to four hours while maintaining the reaction mixture at a predetermined temperature. The predetermined temperature may be dependent on the solvent used, wherein the freezing and boiling points of the solvent may limit the reaction temperature at a lower and upper end respectively.

In one non-limiting embodiment, a method of synthesizing Cu/Cu$_2$O nanocrystals includes dissolving copper (II) chloride dihydrate in 70-90 ml of a solvent to provide a molar concentration of 9-11 mM of copper (II) chloride dihydrate. PVP with an average molecular weight of 35,000-45,000 g/mol is also dissolved in the solvent at a molar concentration of 0.03-0.05 mM of PVP. Then, 9-11 mL of 0.1-0.3 M sodium hydroxide aqueous solution is added, followed by adding 9-11 mL of 0.4-0.8 M L-ascorbic acid aqueous solution to thereby form a reaction mixture.

The reaction mixture is agitated, for example by continuous stirring, for 2-4 hours as a predetermined temperature to thereby precipitate Cu$_2$O/Cu nanocrystals. The Cu$_2$O/Cu nanocrystals are collected by centrifugation, filtration, or the like, and are washed with de-ionized water and ethanol to remove unreacted chemicals, and then dried.

In one embodiment, the predetermined temperature may be from 65° C. to 75° C., from 69° C. to 71° C., 70° C.±0.1-0.5° C., or 70° C. In this embodiment, the method may produce Cu$_2$O/Cu nanocrystals having an average size of from 770 nm to 870 nm, 810 nm to 830 nm, 820 nm±1-5 nm, or 820 nm. The method may produce Cu$_2$O/Cu nanocrystals having a ratio of copper to oxygen from 2.2 to 2.0:1, 2.1:1, or 68.2:31.8. The method may produce Cu$_2$O/Cu nanocrystals in the form of corner-truncated cubes.

In another embodiment, the predetermined temperature may be from 25° C. to 35° C., from 29° C. to 31° C., 30° C.±0.1-0.5° C., or 30° C. In this embodiment, the method may produce Cu$_2$O/Cu nanocrystals having an average size of from 200 nm to 240 nm, 210 nm to 230 nm, 220 nm±1-5 nm, or 220 nm. The method may produce Cu$_2$O/Cu nanocrystals having a ratio of copper to oxygen from 1.6 to 1.4:1, 1.5:1, or 60.7:39.3. The method may produce Cu$_2$O/Cu nanocrystals in the form of slightly corner-truncated cubes.

In still another embodiment, the predetermined temperature may be from −5° C. to 5° C., from −1° C. to 1° C., 0° C.±0.1-0.5° C., or 0° C. In this embodiment, the method may produce Cu$_2$O/Cu nanocrystals having an average size of from 370 nm to 430 nm, 390 nm to 410 nm, 400 nm±1-5 nm, or 400 nm. The method may produce Cu$_2$O/Cu nanocrystals having a ratio of copper to oxygen from 2.9 to 2.7:1, 2.8:1, or 73.6:26.4. The method may produce Cu$_2$O/Cu nanocrystals in the form of slightly corner-truncated cubes, with a higher ratio of {110} facets and {220} facets that those prepared at 70° C.

EXAMPLES

The following Examples 1-3 were conducted in accordance with the present subject matter. In Examples 1-3, the raw materials included copper (II) chloride dihydrate, PVP with an average molecular weight of 40,000 g/mol ("PVP40"), L-ascorbic acid, and sodium hydroxide, all of which were analytical grade chemicals purchased from Sigma Aldrich, of St. Louis, Mo., and used without further modification or purification.

In Examples 1-3, the concentration of the raw materials was kept fixed, and each example was prepared by dissolving copper (II) chloride dihydrate (CuCl$_2$.2H$_2$O) in 80 ml de-ionized water to provide a molar concentration of 10 mM of copper (II) chloride dihydrate in the de-ionized water. PVP40 was dissolved in the de-ionized water and stirred thoroughly until PVP40 dissolved completely to provide a molar concentration of 0.04 mM of PVP40 in the de-ionized water. 10 ml of 0.2 M NaOH aqueous solution was added dropwise into the reaction mixture. After 30 minutes of stirring, 10 ml of 0.6M L-ascorbic acid was applied dropwise into the reaction mixture and the mixture was allowed to react for three hours at a predetermined temperature. During the reaction and depending on the predetermined temperature, the reaction mixture changed color to light blue, dark blue or turbid red. All of Examples 1-3 were carried out under constant stirring and maintained at the predetermined temperature. The resulting precipitate was collected by centrifugation and washed with de-ionized water three times and ethanol twice to remove unreacted chemicals, and finally dried at 40° C. in a vacuum oven for 6 hours to thereby produce Cu$_2$O/Cu nanocrystals.

Table 1 below provides a summary for the experimental conditions for all the examples, and results of the Cu/Cu$_2$O nanocrystal synthesis at different predetermined temperatures.

TABLE 1

| Ex. | Temperature and Reaction Time | Concentration of CuCl$_2$•2H$_2$O | Concentration of PVP40 | Crystal Shape | Crystal Size |
|---|---|---|---|---|---|
| 1 | 70° C., 3 h | 10.0 mM | 0.4 mM | Corner truncated cube | 820 nm |
| 2 | 30° C., 3 h | 10.0 mM | 0.4 mM | Slightly corner truncated cube | 220 nm |
| 3 | 0° C., 3 h | 10.0 mM | 0.4 mM | Slightly corner truncated cube | 400 nm |

Figure 1:
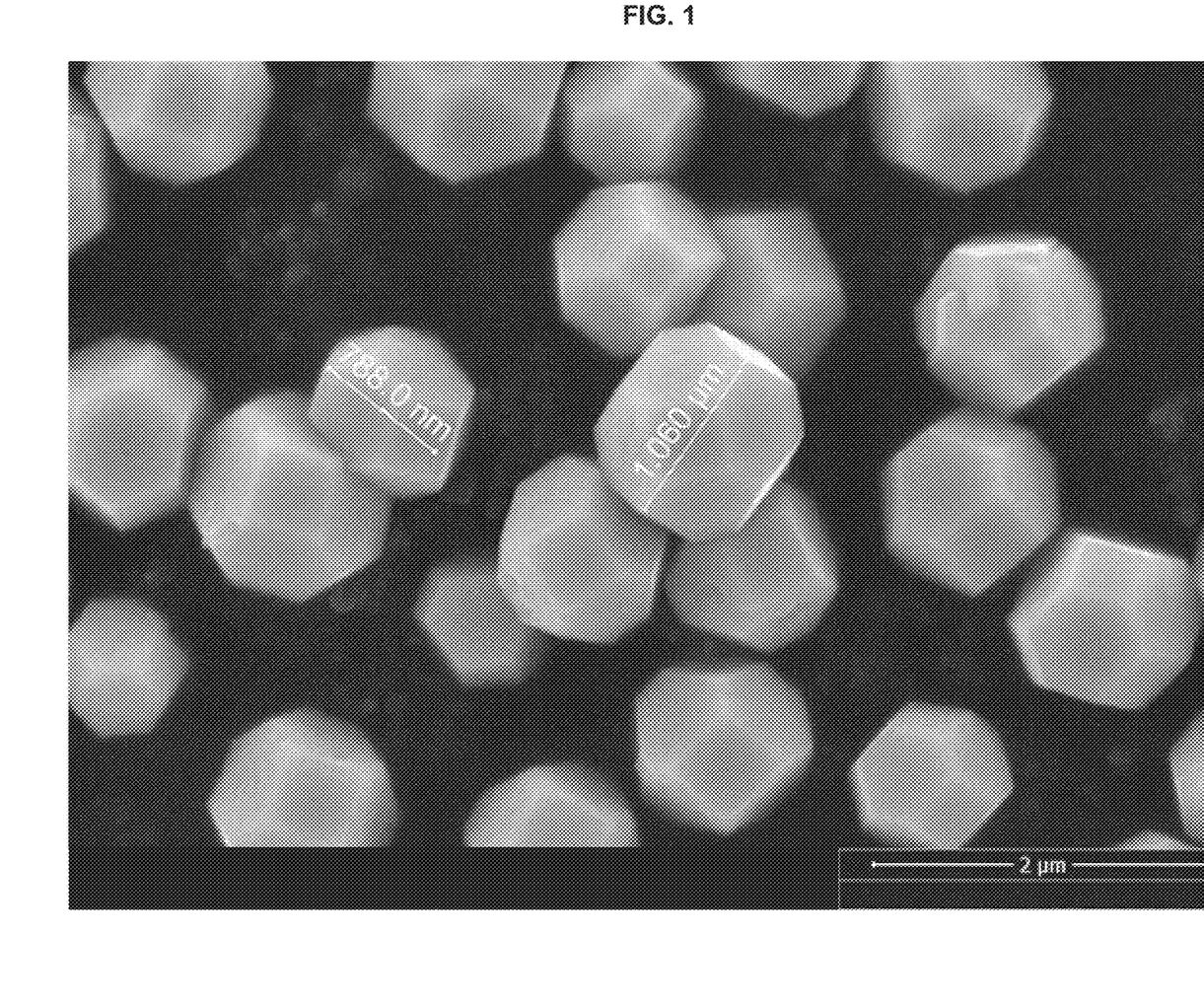
FIG. 1 is an SEM image of Cu/$Cu_2O$ nanocrystals prepared at 70° C. in accordance with the present subject matter.
Figure 2:
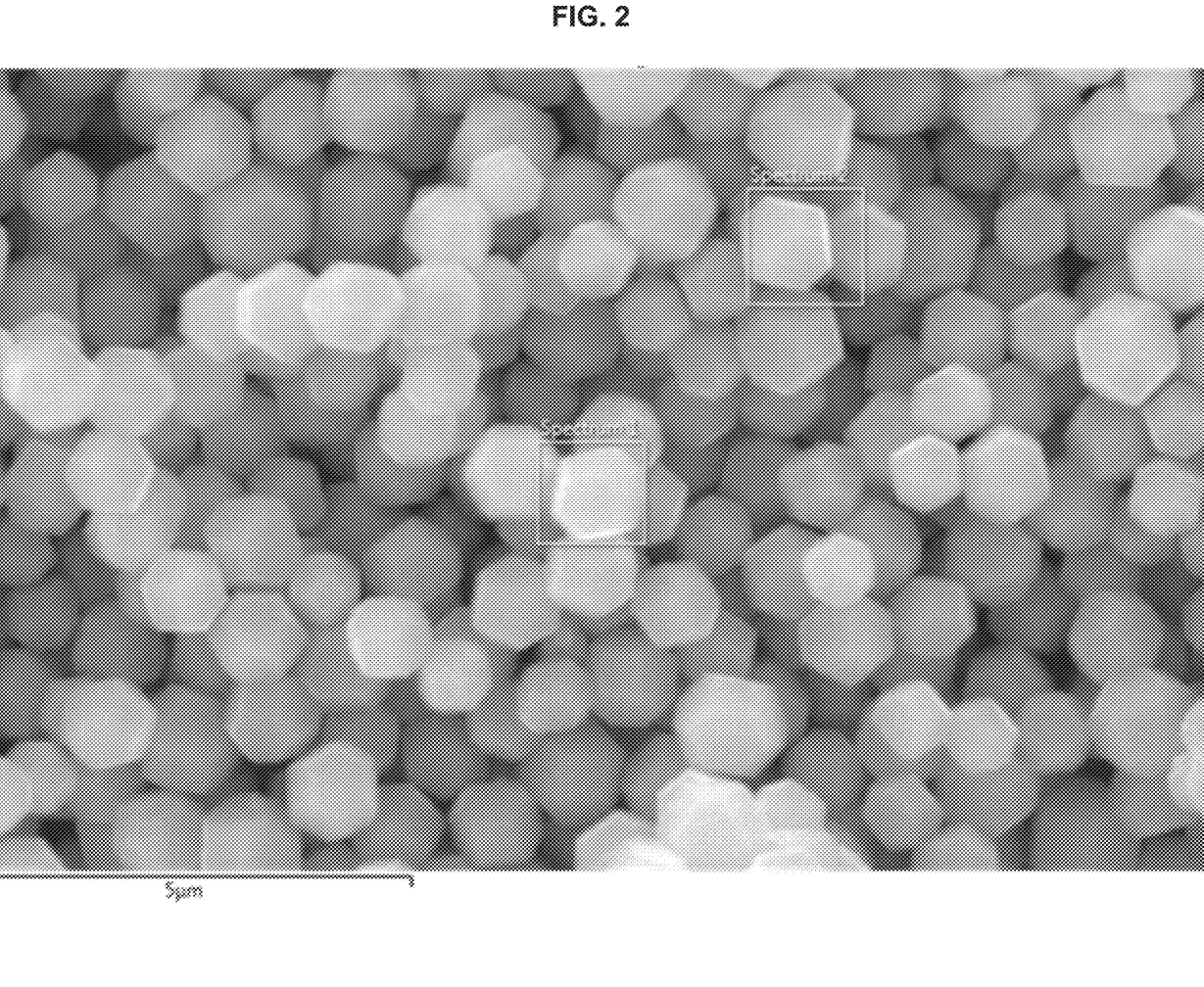
FIG. 2 is another SEM image of Cu/$Cu_2O$ nanocrystals prepared at 70° C.
Figure 3:
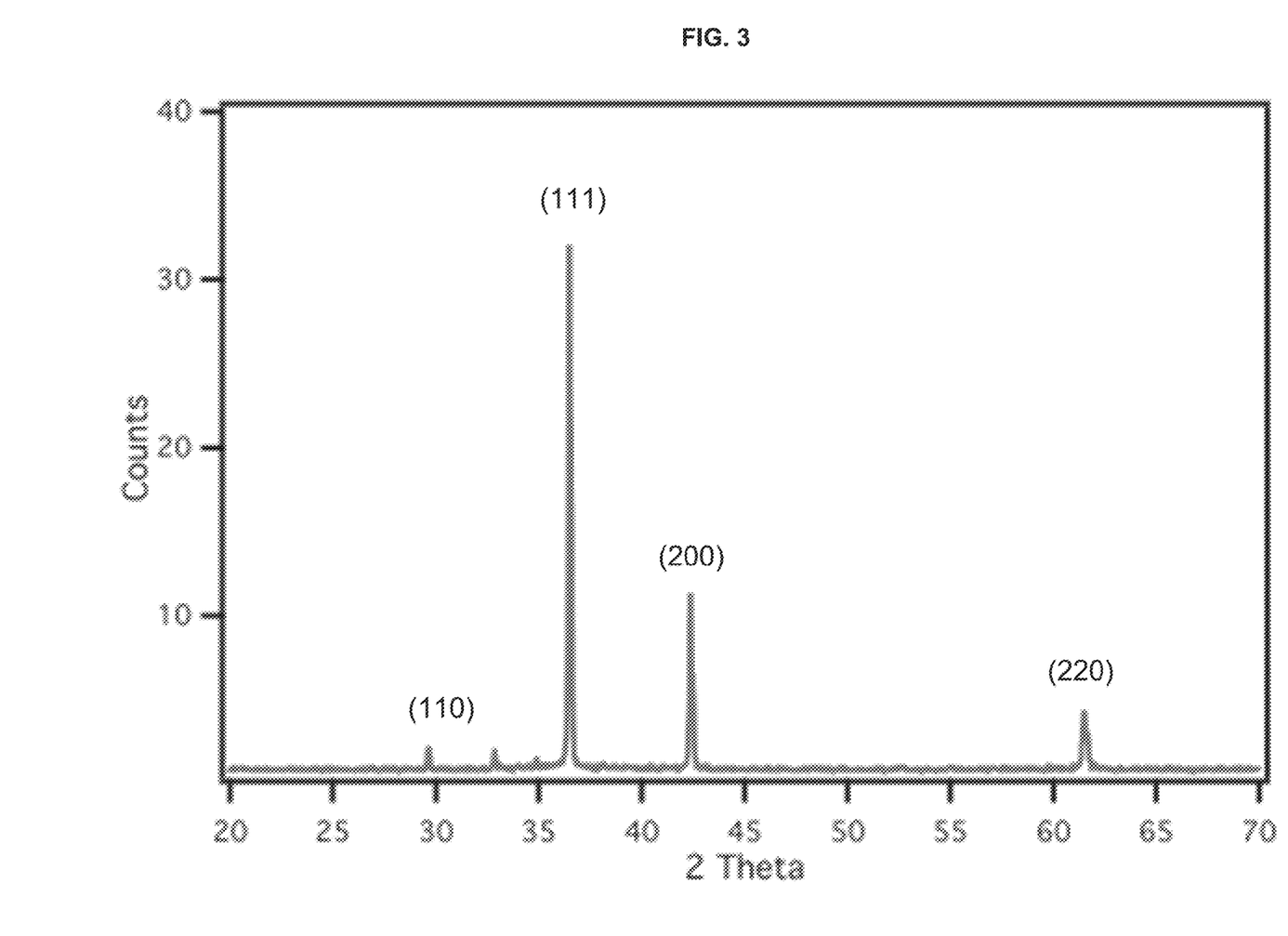
FIG. 3 is a powder XRD pattern of Cu/$Cu_2O$ nanocrystals prepared at 70° C.
Figure 4:
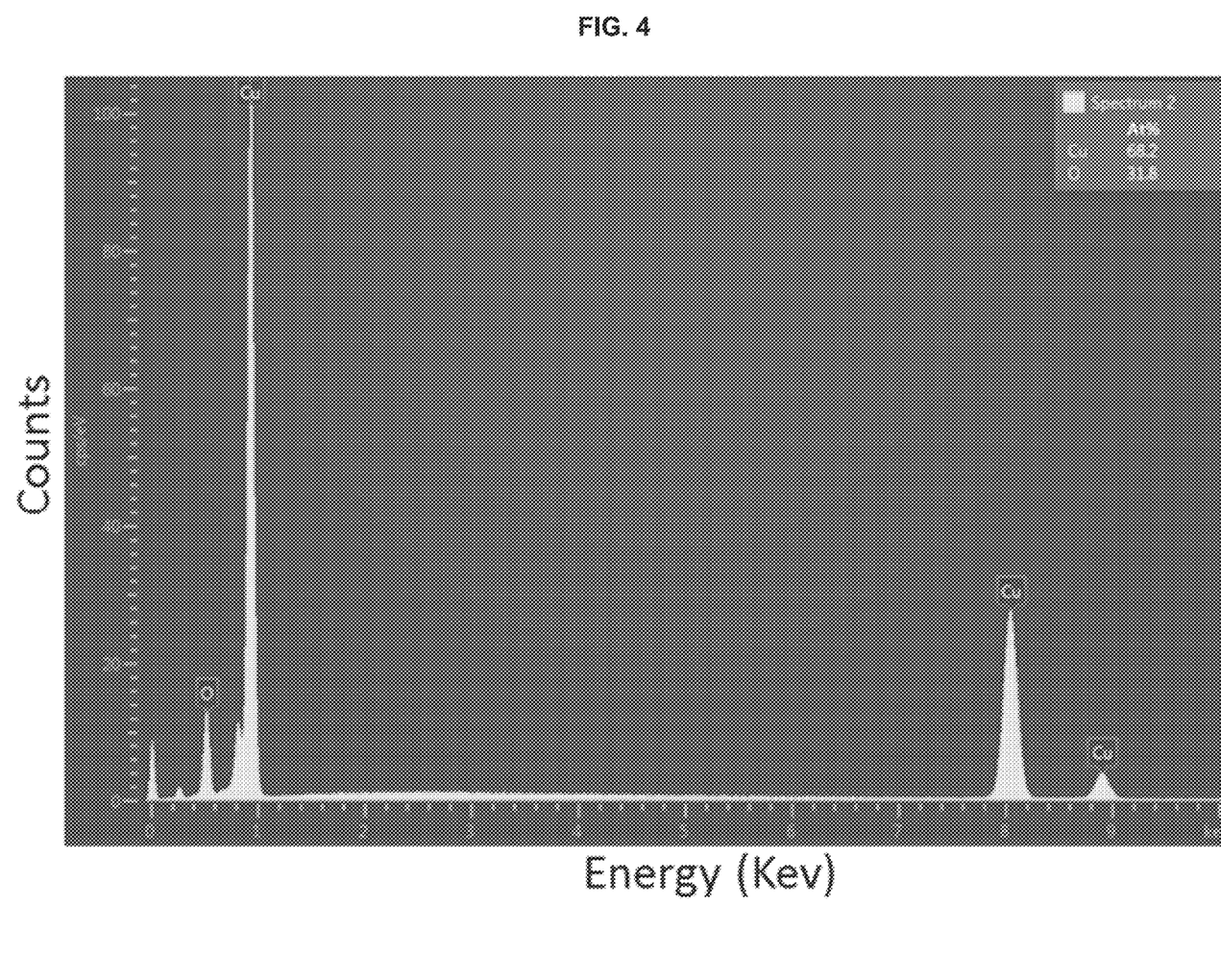
FIG. 4 is an energy dispersive X-ray pattern of Cu/$Cu_2O$ nanocrystals prepared at 70° C.

Referring to the figures, the synthesis of Example 1 was performed at a predetermined temperature of 70° C. for three hours. Results of Example 1 are depicted in FIGS. 1-4. As depicted in FIG. 1, which is an SEM image, and FIG. 2, which is another SEM image produced in conjunction with the energy dispersive X-ray (EDX) pattern of FIG. 4, the Cu/Cu$_2$O nanocrystals prepared at 70° C. displayed uniform shapes, had a sharper-edged corner truncated cube shapes, and particle sizes of 820 nm±50 nm. FIG. 3 depicts a powder XRD pattern for the Cu/Cu$_2$O nanocrystals prepared at 70° C. As depicted in FIG. 4, which is an elemental analysis shown on an energy dispersive X-ray pattern, the Cu/Cu$_2$O nanocrystals prepared at 70° C. had a ratio of Cu:O of 68.2:31.8.

Figure 5:
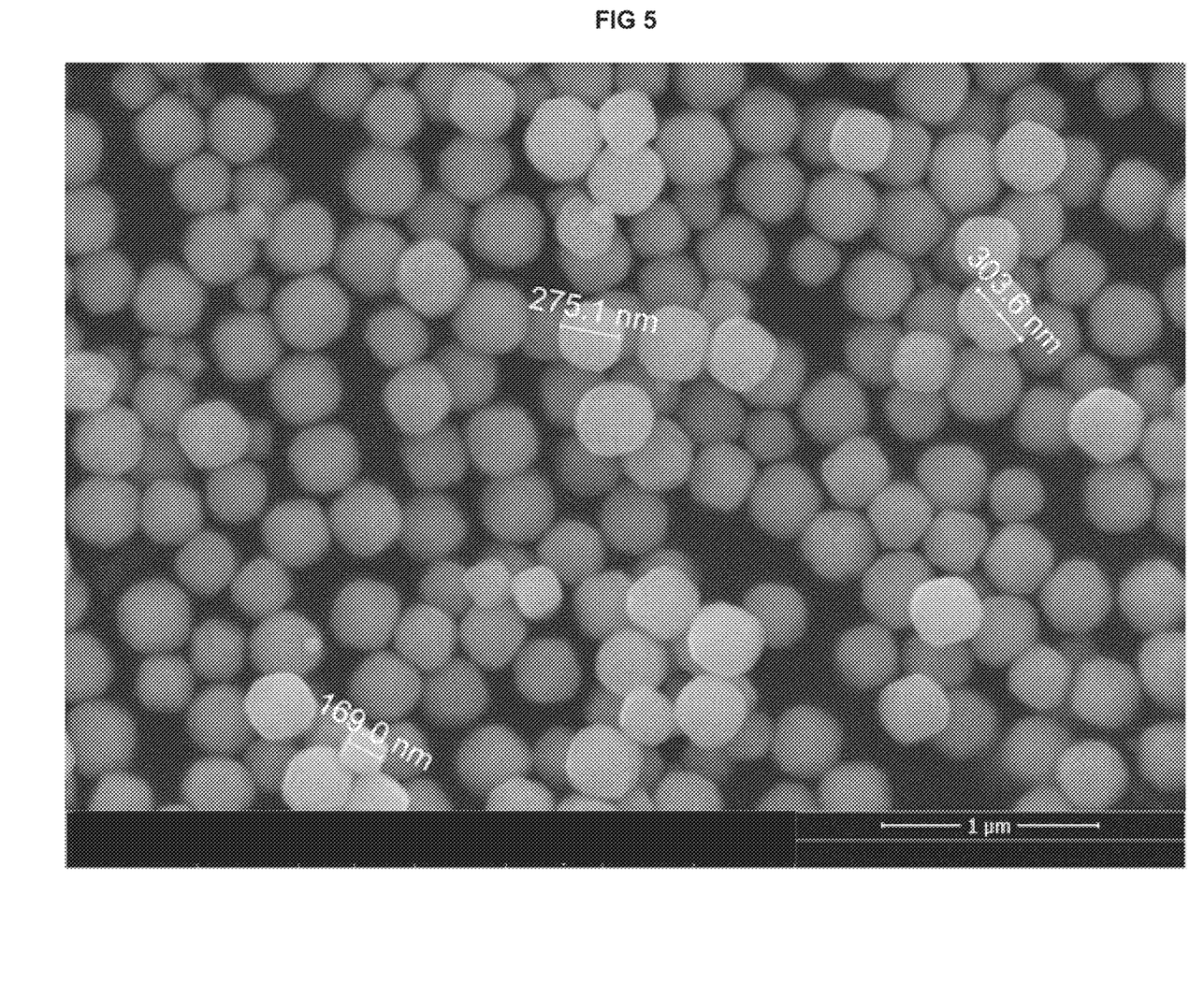
FIG. 5 is an SEM image of Cu/$Cu_2O$ nanocrystals prepared at 30° C. in accordance with the present subject matter.
Figure 6:
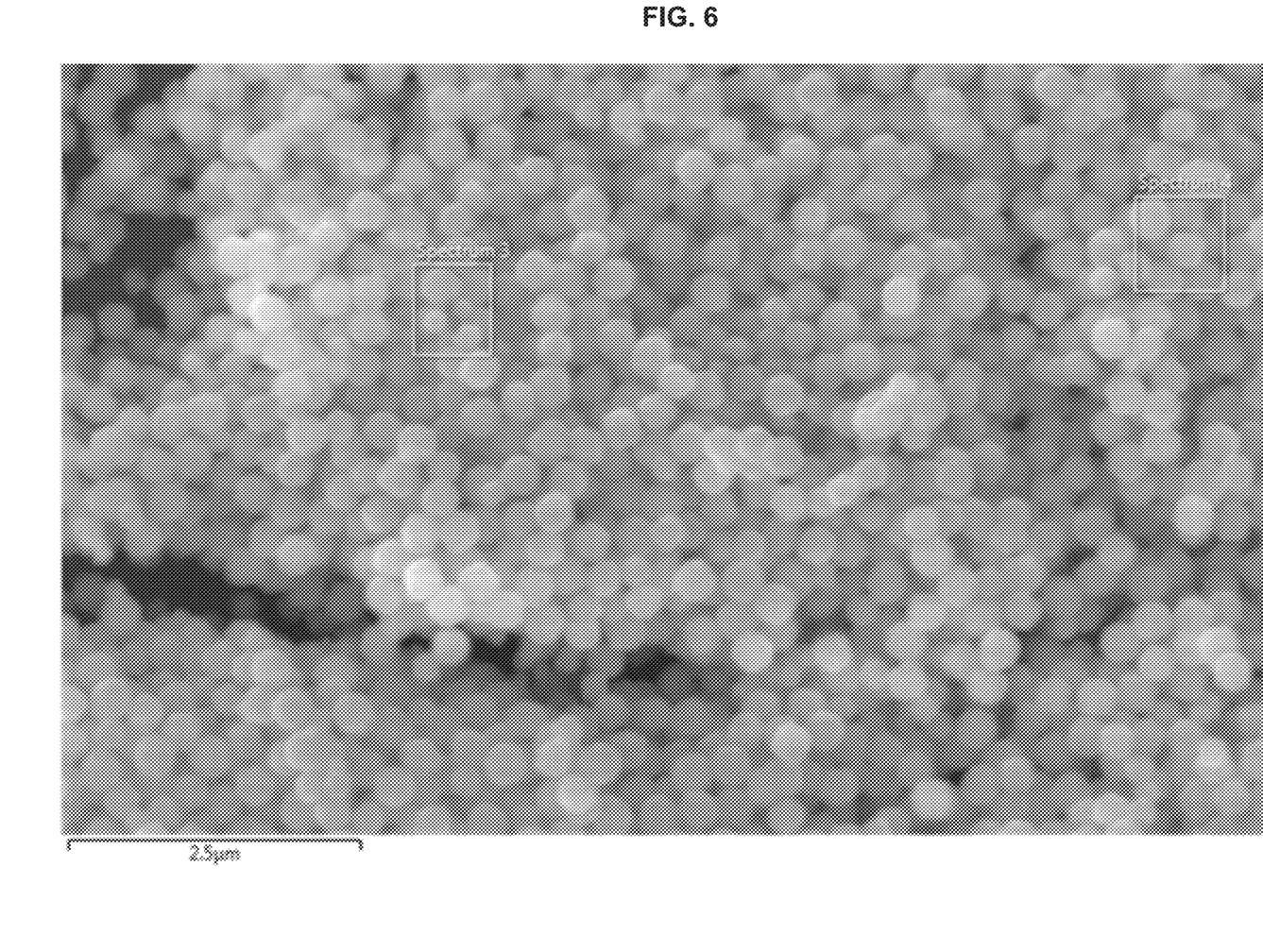
FIG. 6 is another SEM image of Cu/$Cu_2O$ nanocrystals prepared at 30° C.
Figure 7:
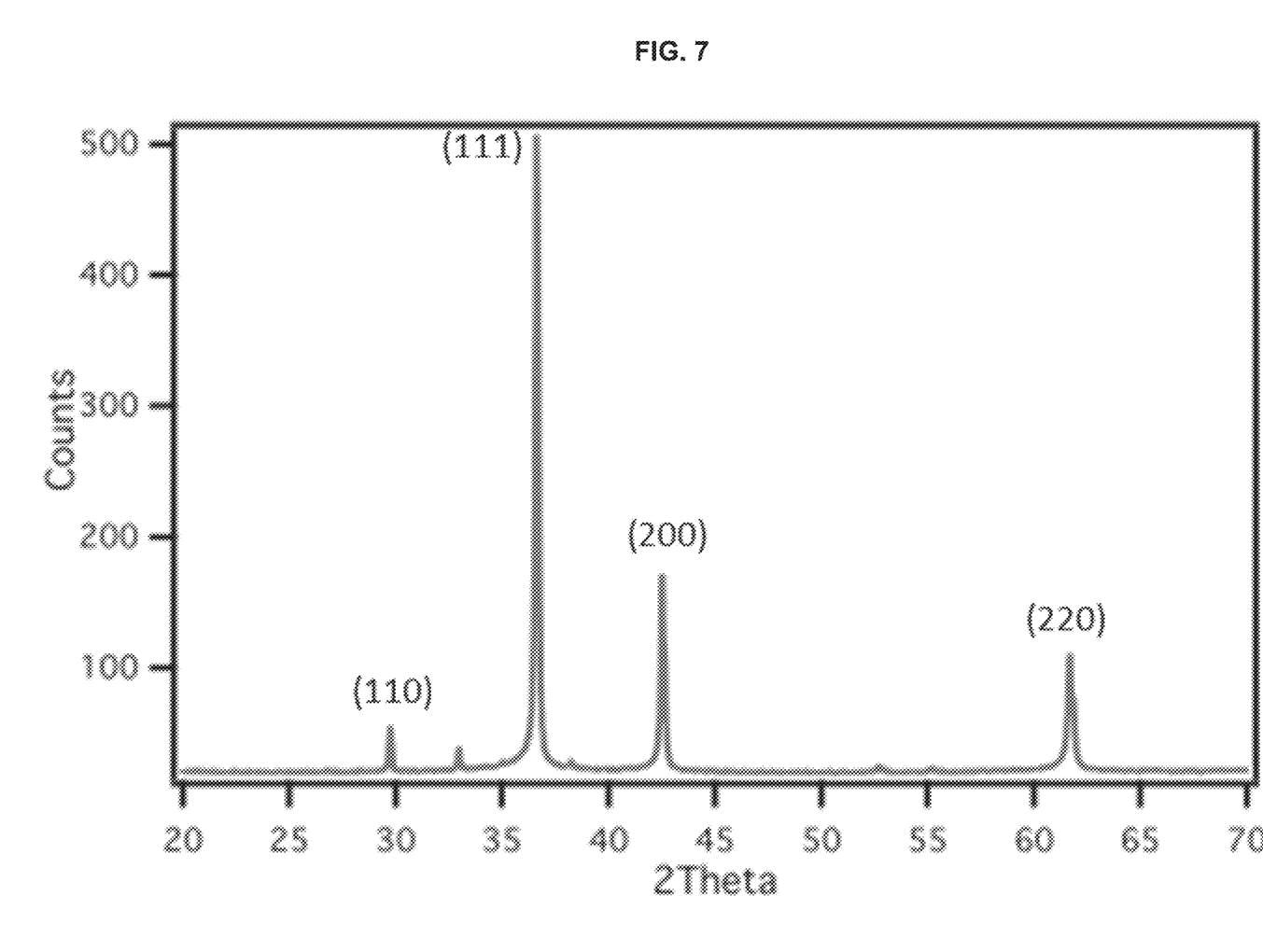
FIG. 7 is a powder XRD pattern of Cu/$Cu_2O$ nanocrystals prepared at 30° C.
Figure 8:
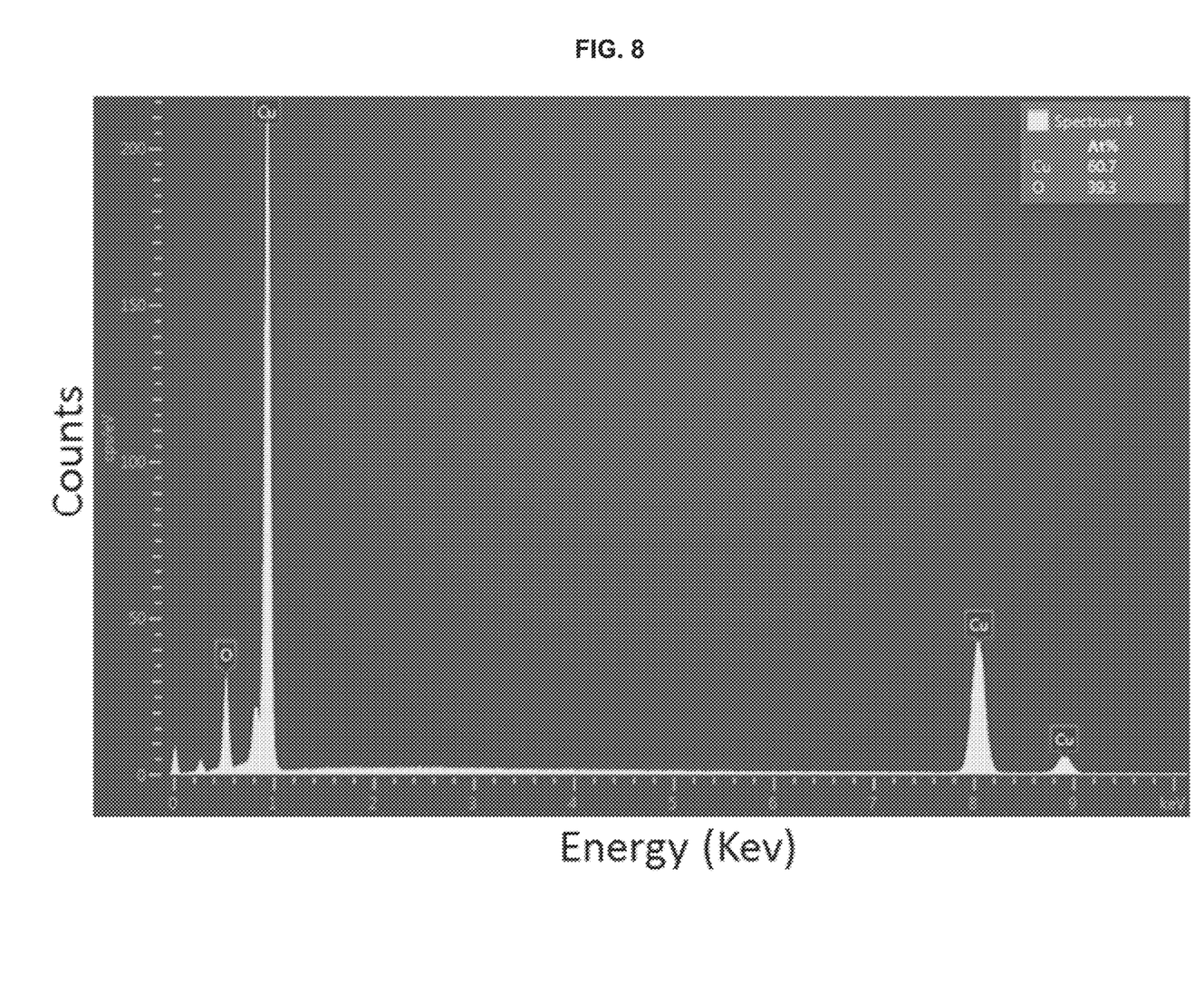
FIG. 8 is an energy dispersive X-ray pattern of Cu/$Cu_2O$ nanocrystals prepared at 30° C.

The synthesis of Example 2 was performed at a predetermined temperature of 30° C. for three hours. Results of Example 2 are depicted in FIGS. 5-8. As depicted in FIG. 5, which is an SEM image, and FIG. 6, which is another SEM image produced in conjunction with the energy dispersive X-ray pattern of FIG. 8, the Cu/Cu$_2$O nanocrystals prepared at 30° C. displayed uniform shapes, had slightly corner truncated cube shapes, and particle sizes of 220 nm±20 nm. FIG. 7 depicts a powder XRD pattern for the Cu/Cu$_2$O nanocrystals prepared at 30° C. As depicted in FIG. 8, which is an elemental analysis shown on an energy dispersive X-ray pattern, the Cu/Cu$_2$O nanocrystals prepared at 30° C. had a ratio of Cu:O of 60.7:39.3.

Figure 9:
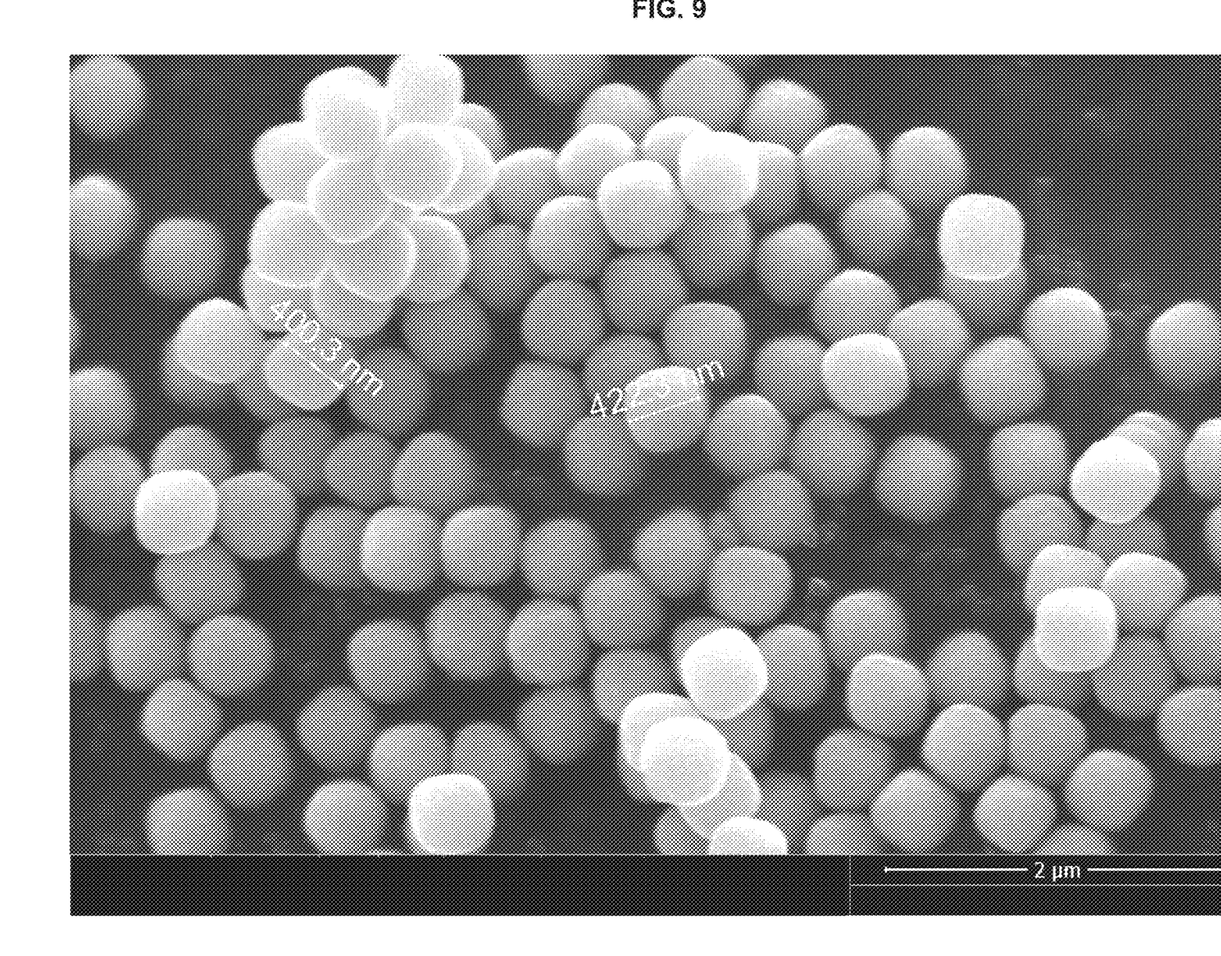
FIG. 9 is an SEM image of Cu/$Cu_2O$ nanocrystals prepared at 0° C. in accordance with the present subject matter.
Figure 10:
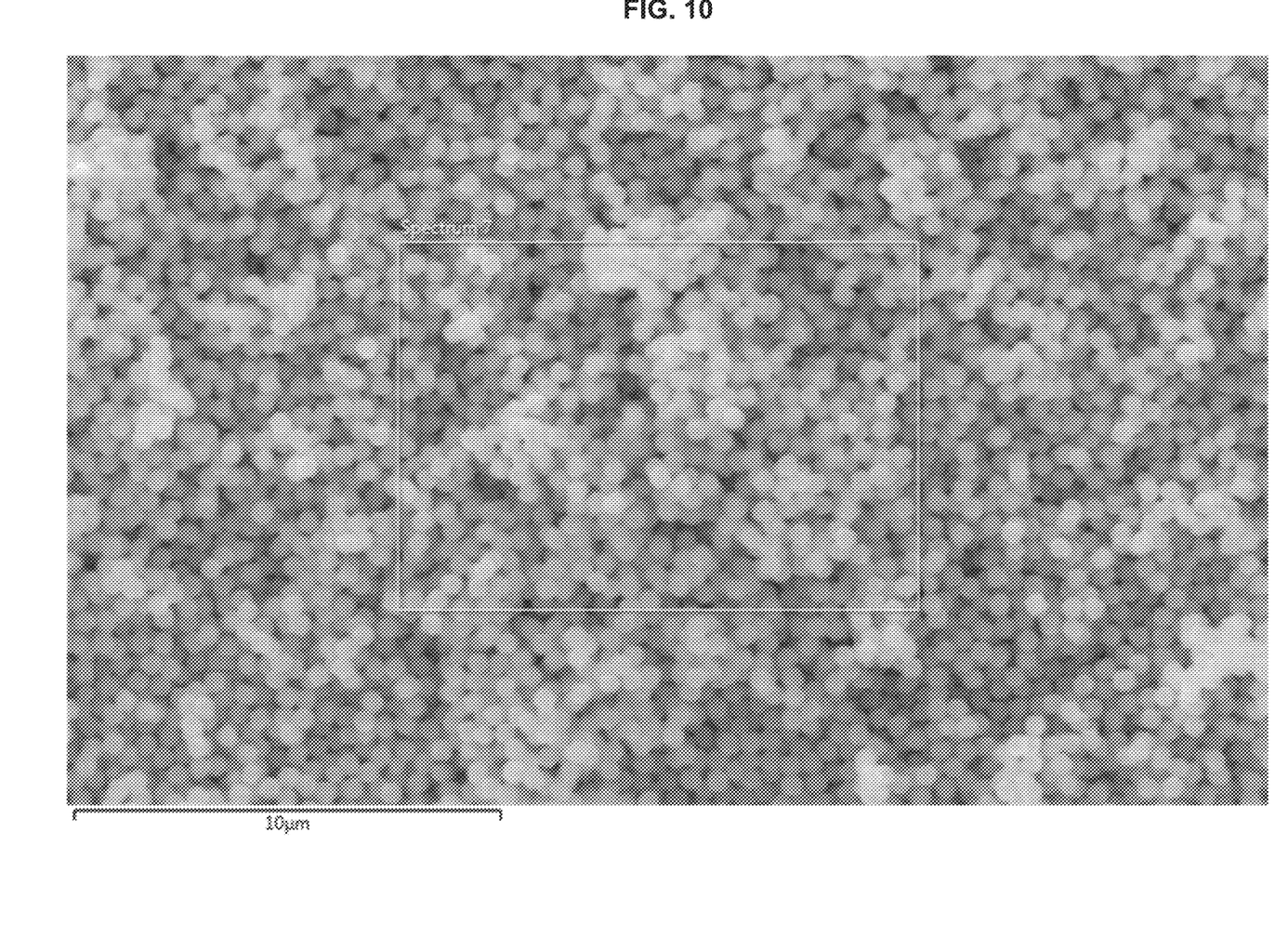
FIG. 10 is another SEM image of Cu/$Cu_2O$ nanocrystals prepared at 0° C.

The synthesis of Example 3 was performed at a predetermined temperature of 0° C. for three hours. Results of Example 3 are depicted in FIGS. 9-12. As depicted in FIG. 9, which is an SEM image, and FIG. 10, which is another SEM image produced in conjunction with the energy dispersive X-ray pattern of FIG. 12, the Cu/Cu$_2$O nanocrystals prepared at 0° C. displayed uniform shapes, had slightly corner truncated cube shapes, and particle sizes of 400 nm±30 nm. Comparison of FIG. 11, which is a powder XRD pattern, and FIG. 3 reveals that the Cu/Cu$_2$O nanocrystals prepared at 0° C. had a ratio of {110} facets and {220} facets greater than those prepared at 70° C. As depicted in FIG. 12, which is an elemental analysis shown on an energy dispersive X-ray pattern, the Cu/Cu$_2$O nanocrystals prepared at 0° C. had a ratio of Cu:O of 73.6:26.4.

As can be seen, the morphology of the Cu/Cu$_2$O nanocrystals, including the shape, size, and ratio of copper to oxygen, is dependent on the reaction temperature. At a reaction temperature greater than 30° C., for example at 70° C., the Cu/Cu$_2$O nanocrystals were generally larger (average 810 nm), sharper-edged corner truncated cubes, but at lower temperatures, for example at 30° C. and 0° C., the crystal size was smaller and the shape was a slightly corner-truncated cube.

Figure 11:
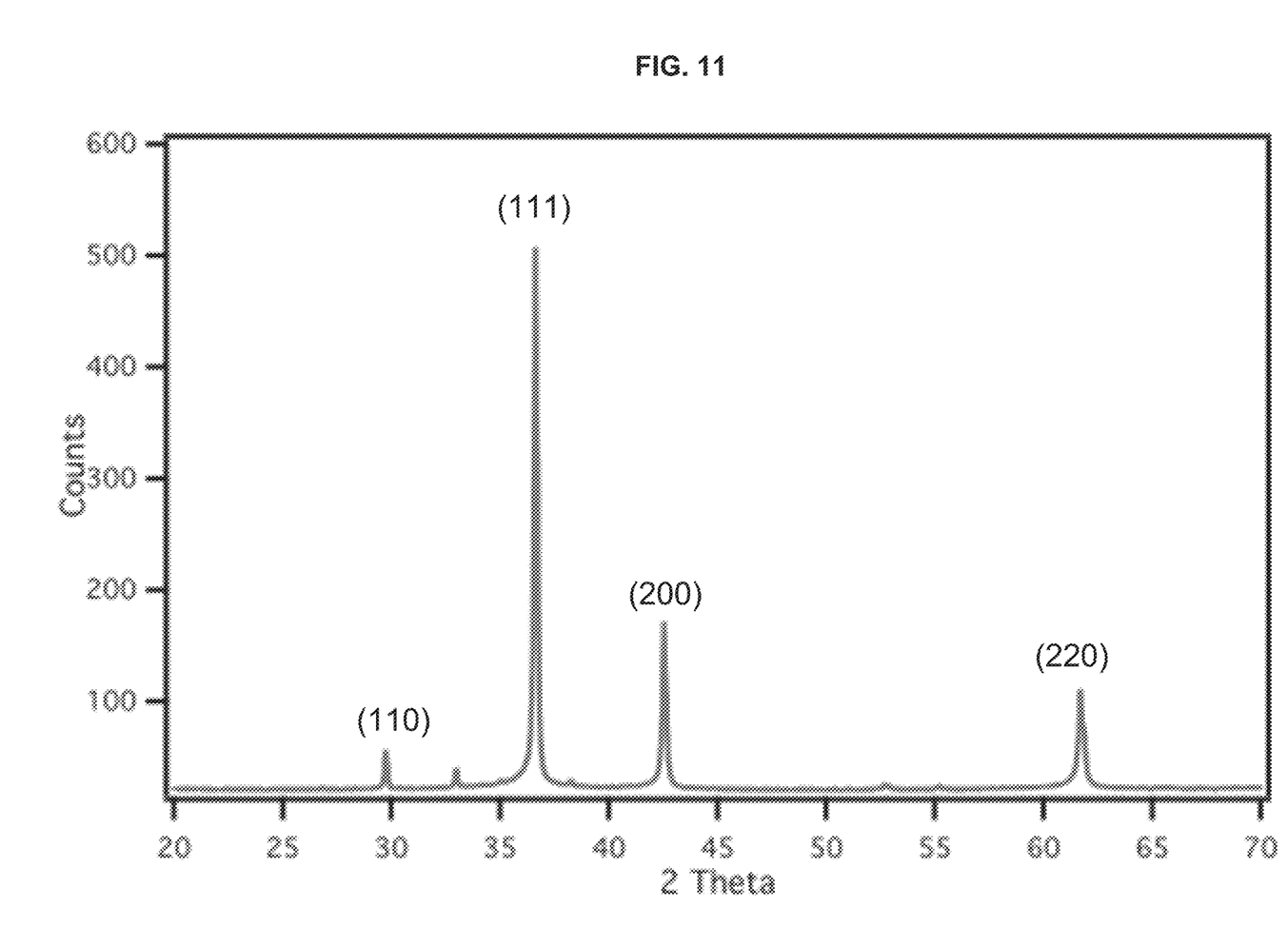
FIG. 11 is a powder XRD pattern of Cu/$Cu_2O$ nanocrystals prepared at 0° C.
Figure 12:
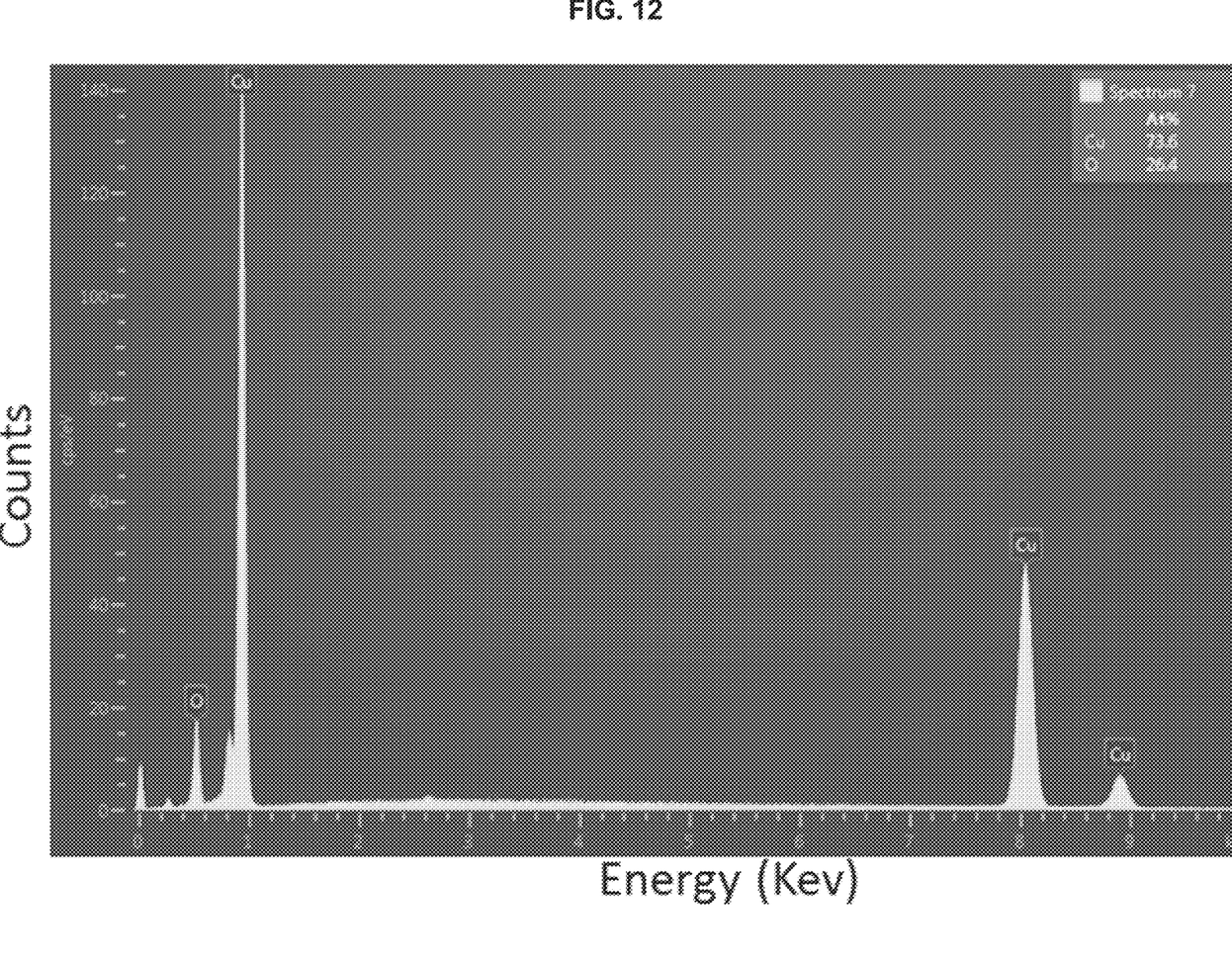
FIG. 12 is an energy dispersive X-ray pattern of Cu/$Cu_2O$ nanocrystals prepared at 0° C.

The structural properties of the synthesized Cu/Cu$_2$O nanocrystals were analyzed by the X-ray diffraction (XRD) patterns shown in FIGS. 3, 7 and 11. The diffraction peaks at 29.7°, 36.6°, 42.6° and 61.7° were assigned to the crystal facets of {110}, {111}, {200} and {220}, respectively as depicted.

Significantly, Cu/Cu$_2$O nanocrystals synthesized at temperatures of 30° C. and 0° C. have a higher ratio of facets {110} and {220} than those prepared at a reaction temperature of 70° C. As discussed herein, when Cu/Cu$_2$O nanocrystals are used as a catalyst for reduction of carbon dioxide, the {110} facet series was reported to show superior catalytic performance compared to {100} and {111} facets.

Energy dispersive X-ray was applied to study the atomic composition of the synthesized nanocrystals shown in FIGS. 2 and 4, 6 and 8, and 10 and 12. The resulting EDX spectra exhibit the characteristic peaks of Cu and O. Furthermore, the atomic ratio of Cu to O in Cu/Cu$_2$O crystals synthesized at a low temperature of 0° C. is more than the theoretical value of 2:1, indicating that the crystal is a mixture of Cu and Cu$_2$O. This indicates that there is metallic copper produced in the process that will benefit the electrocatalytic reduction of CO$_2$ or other applications.

The present subject matter provides a simple approach to achieve the crystallographic morphology construction of Cu/Cu$_2$O nanocrystals by controlling the temperature during the synthetic process. Temperature regulation enables control of the average particle size and shape of the Cu/Cu$_2$O nanocrystals. The size distribution of the Cu/Cu$_2$O nanocrystals ranges from 200 nm to 1000 nm. The shape of the Cu/Cu$_2$O nanocrystals varies from edged corner truncated cubes to slightly corner truncated cubes. Significantly, Cu/Cu$_2$O crystals synthesized at lower temperature than 30° C. have higher ratio of facets {110} and {220} than that above 30° C. Furthermore, the atomic ratio of Cu to O in Cu/Cu$_2$O crystals synthesized from 0° C. is more than 2:1. This simple synthetic approach has advantages such as mass production, easy operation, high reproducibility and may provide a systematically direct method for the morphology transformation of other materials.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of producing Cu$_2$O/Cu nanocrystals, comprising:
    providing a solution including a copper ion contributor and a capping agent dissolved in a solvent;
    adding a reducing agent to the solution to thereby form a reaction mixture; and
    reacting the reaction mixture at a predetermined temperature to thereby precipitate Cu$_2$O/Cu nanocrystals from the reaction mixture;
    wherein the predetermined temperature is from 65° C. to 75° C., from 25° C. to 35° C., or from −5° C. to 5° C.;
    wherein a molar ratio of the capping agent to the copper ion contributor is 0.0005-0.08 in the reaction mixture.

2. The method according to claim 1, wherein the solvent comprises water, aqueous ammonia solutions, an organic solvent, or combinations thereof.

3. The method according to claim 2, wherein the solvent is deionized water.

4. The method according to claim 1, wherein the copper ion contributor comprises copper (II) chloride (CuCl$_2$), copper (II) fluoride (CuF$_2$), copper (II) bromide (CuBr$_2$), copper (II) iodide (CuI$_2$), cuprous iodide (CuI), copper (II) oxide (CuO), copper (II) sulfide (CuS), copper (II) sulfate (CuSO$_4$), copper (II) nitride (Cu$_3$N$_2$), copper(II) nitrate (Cu(NO$_3$)$_2$), copper (II) phosphide (Cu$_3$P$_2$), copper(II) acetate (Cu(CH$_2$CO$_2^-$)), copper (II) hydroxide (CuOH)$_2$, copper(II) carbonate (CuCO$_3$), copper(II) acetylacetonate (Cu(C$_5$H$_7$O$_2$)$_2$), a hydrate thereof, or combinations thereof.

5. The method according to claim 4, wherein the copper ion contributor is copper (II) chloride dihydrate, and the copper (II) chloride dihydrate is included at a molar concentration of 5-15 mM.

6. The method according to claim 1, wherein the capping agent comprises polyvinylpyrrolidone, plant-derived extracts, ethylene glycol, oleic acid, sodium laureth sulfate, sodium metaphosphate, oleylamine, dodecylbenzenesulfonic acid, ethylene diamine, triphenylphosphine oxide, peracetic acid, polyethylene glycol, fructose, tetramethylammonium hydroxide, amino acids, or combinations thereof.

7. The method according to claim 6, wherein the capping agent is polyvinylpyrrolidone with an average molecular weight of 30,000-50,000 g/mol, and the polyvinylpyrrolidone is included at a molar concentration of 0.01-0.08 mM.

8. The method according to claim 1, wherein the reducing agent comprises L-ascorbic acid, hydrazine monohydrate, sodium borohydride, hydrazine, 1,2-hexadecanediol, glucose, carbon monoxide, sulfur dioxide, iodides, hydrogen peroxide, oxalic acid, formic acid, carbon, reducing sugars, a borane compound, or combinations thereof.

9. The method according to claim 8, wherein the reducing agent is L-ascorbic acid, and the L-ascorbic acid is included at a molar concentration of 0.01-0.1 M.

10. The method according to claim 1, further comprising adding a pH adjuster to the reaction mixture to adjust the pH of the reaction mixture to be between 2.0 and 12.0.

11. The method according to claim 10, wherein the pH adjuster is sodium hydroxide, and the sodium hydroxide is included at a molar concentration of 0.005-0.04 M.

12. A method of producing Cu$_2$O/Cu nanocrystals, comprising:
    providing a solution including a copper ion contributor and a capping agent dissolved in a solvent;
    adding a reducing agent to the solution to thereby form a reaction mixture;
    determining a desired morphology for the Cu$_2$O/Cu nanocrystals from among 820 nm±50 nm corner truncated cubes, 220 nm±20 nm slightly corner truncated cubes, and 400 nm±30 nm slightly corner truncated cubes;
    if the desired morphology is 820 nm±50 nm corner truncated cubes, then reacting the reaction mixture at a temperature of 65° C. to 75° C. to thereby precipitate Cu$_2$O/Cu nanocrystals with the desired morphology from the reaction mixture;
    if the desired morphology is 220 nm±20 nm slightly corner truncated cubes, then reacting the reaction mixture at a temperature of 25° C. to 35° C. to thereby precipitate Cu$_2$O/Cu nanocrystals with the desired morphology from the reaction mixture; and
    if the desired morphology is 400 nm±30 nm is slightly corner truncated cubes, then reacting the reaction mixture at a temperature of −5° C. to 5° C. to thereby precipitate Cu$_2$O/Cu nanocrystals with the desired morphology from the reaction mixture.

13. The method according to claim 12, wherein a ratio of the capping agent to the copper ion contributor is 0.0005-0.08.

14. The method according to claim 12, wherein the copper ion contributor comprises copper (II) chloride dihydrate, and the copper (II) chloride dihydrate is included at a molar concentration of 5-15 mM.

15. The method according to claim 12, wherein the capping agent comprises polyvinylpyrrolidone, plant-derived extracts, ethylene glycol, oleic acid, sodium laureth sulfate, sodium metaphosphate, oleylamine, dodecylbenzenesulfonic acid, ethylene diamine, triphenylphosphine oxide, peracetic acid, polyethylene glycol, fructose, tetramethylammonium hydroxide, amino acids, or combinations thereof.

16. The method according to claim 15, wherein the capping agent is polyvinylpyrrolidone with an average molecular weight of 30,000-50,000 g/mol, and the polyvinylpyrrolidone is included at a molar concentration of 0.01-0.08 mM.

17. The method according to claim 12, wherein the reducing agent comprises L-ascorbic acid, hydrazine monohydrate, sodium borohydride, hydrazine, 1,2-hexadecanediol, glucose, carbon monoxide, sulfur dioxide, iodides, hydrogen peroxide, oxalic acid, formic acid, carbon, reducing sugars, a borane compound, or combinations thereof.

18. The method according to claim 12, further comprising adding sodium hydroxide to the reaction mixture to adjust the pH of the reaction mixture to be between 2.0 and 12.0; wherein the sodium hydroxide is included at a molar concentration of 0.005-0.04 M.

19. The method according to claim 18, wherein the reducing agent is L-ascorbic acid, and the L-ascorbic acid is included at a molar concentration of 0.01-0.1 M.

20. A method of producing $Cu_2O/Cu$ nanocrystals, comprising:
    providing a solution including a copper ion contributor and a capping agent dissolved in a solvent;
    adding a reducing agent to the solution to thereby form a reaction mixture; and
    reacting the reaction mixture at a predetermined temperature to thereby precipitate $Cu_2O/Cu$ nanocrystals from the reaction mixture;
    wherein the predetermined temperature is from 65° C. to 75° C., from 25° C. to 35° C., or from −5° C. to 5° C.; and
    wherein the copper ion contributor is copper (II) chloride dihydrate, and the copper (II) chloride dihydrate is included at a molar concentration of 5-15 mM.

21. A method of producing $Cu_2O/Cu$ nanocrystals, comprising:
    providing a solution including a copper ion contributor and a capping agent dissolved in a solvent;
    adding a reducing agent to the solution to thereby form a reaction mixture; and
    reacting the reaction mixture at a predetermined temperature to thereby precipitate $Cu_2O/Cu$ nanocrystals from the reaction mixture;
    wherein the predetermined temperature is from 65° C. to 75° C., from 25° C. to 35° C., or from −5° C. to 5° C.; and
    wherein the capping agent comprises polyvinylpyrrolidone, plant-derived extracts, ethylene glycol, oleic acid, sodium laureth sulfate, sodium metaphosphate, oleylamine, dodecylbenzenesulfonic acid, ethylene diamine, triphenylphosphine oxide, peracetic acid, polyethylene glycol, fructose, tetramethylammonium hydroxide, amino acids, or combinations thereof.

22. A method of producing $Cu_2O/Cu$ nanocrystals, comprising:
    providing a solution including a copper ion contributor and a capping agent dissolved in a solvent;
    adding a reducing agent to the solution to thereby form a reaction mixture; and
    reacting the reaction mixture at a predetermined temperature to thereby precipitate $Cu_2O/Cu$ nanocrystals from the reaction mixture;
    wherein the predetermined temperature is from 65° C. to 75° C., from 25° C. to 35° C., or from −5° C. to 5° C.; and
    wherein the reducing agent is L-ascorbic acid, and the L-ascorbic acid is included at a molar concentration of 0.01-0.1 M.

23. A method of producing $Cu_2O/Cu$ nanocrystals, comprising:
    providing a solution including a copper ion contributor and a capping agent dissolved in a solvent;
    adding a reducing agent to the solution to thereby form a reaction mixture;
    adding a pH adjuster to the reaction mixture to adjust the pH of the reaction mixture to be between 2.0 and 12.0; and
    reacting the reaction mixture at a predetermined temperature to thereby precipitate $Cu_2O/Cu$ nanocrystals from the reaction mixture;
    wherein the predetermined temperature is from 65° C. to 75° C., from 25° C. to 35° C., or from −5° C. to 5° C.

* * * * *